July 14, 1942.  G. J. KOCH ET AL  2,289,843
TRANSPARENCY SLIDE-PROJECTOR HOLDER AND METHOD AND
APPARATUS FOR ASSEMBLING THE SAME
Filed Aug. 2, 1940    4 Sheets-Sheet 1
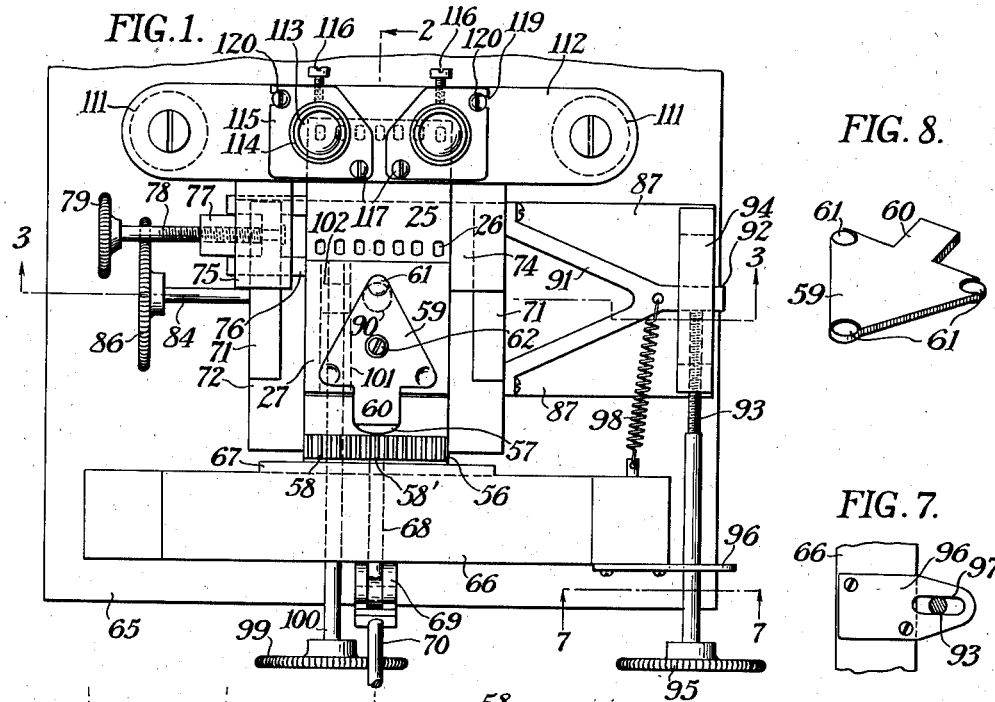
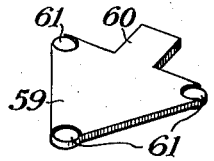
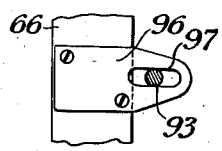
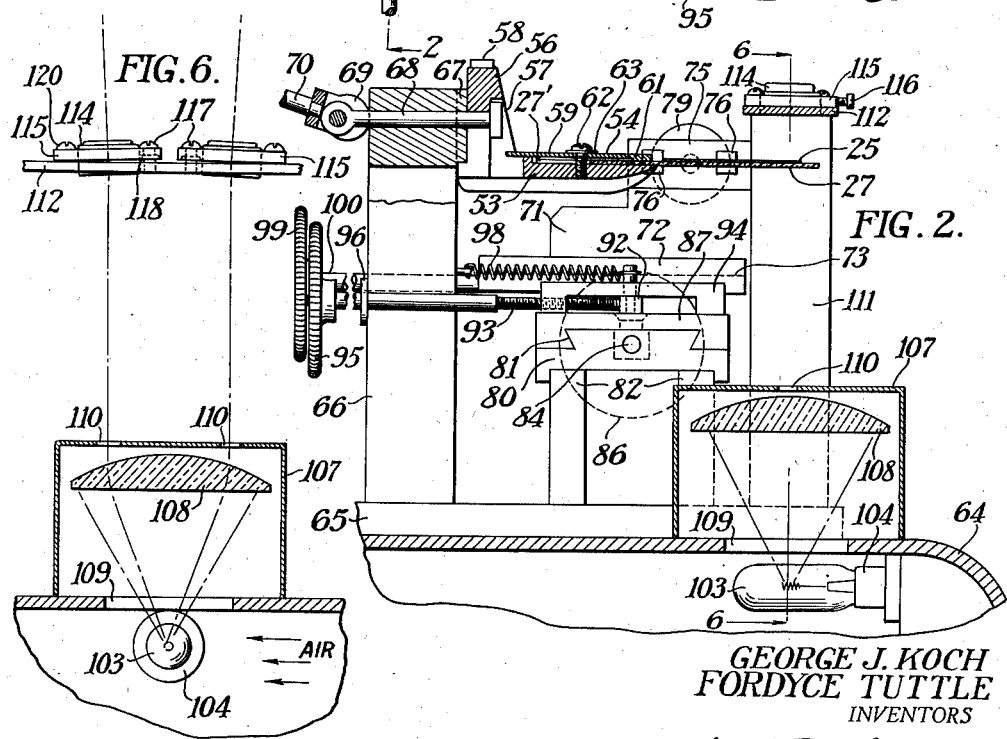
GEORGE J. KOCH
FORDYCE TUTTLE
INVENTORS
BY
ATTORNEYS

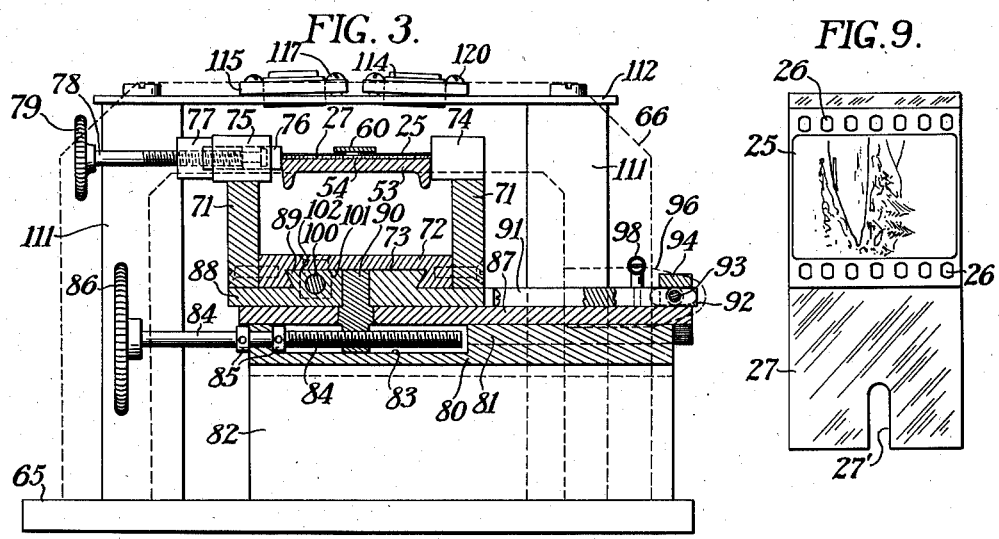
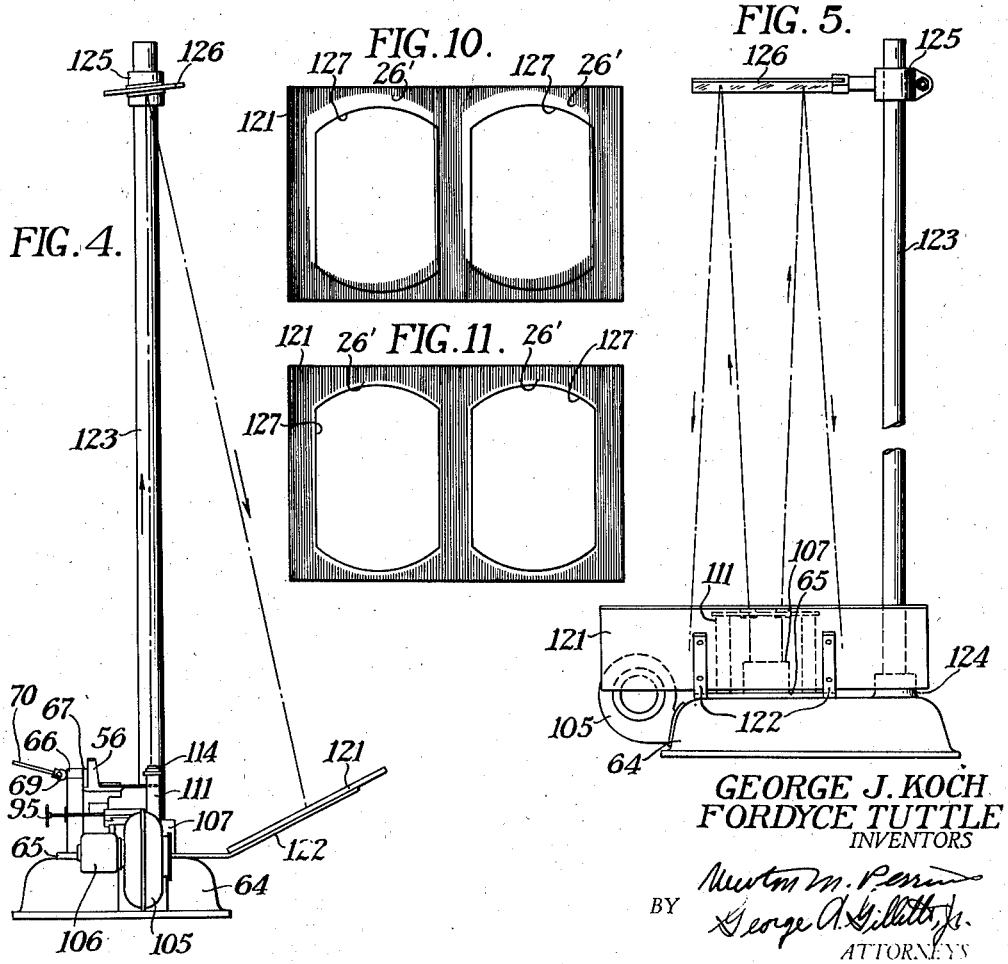

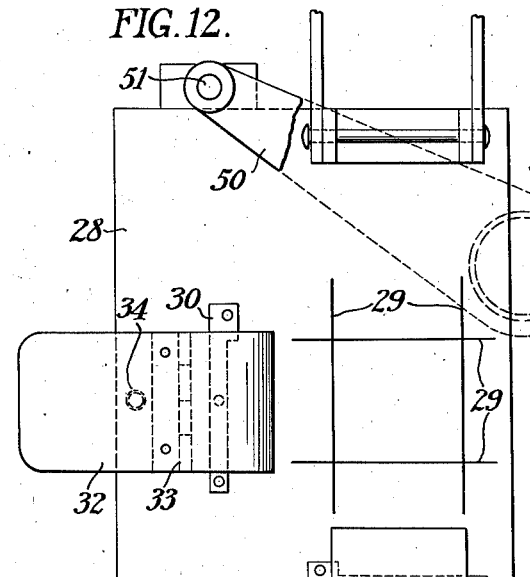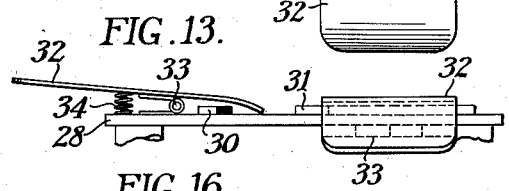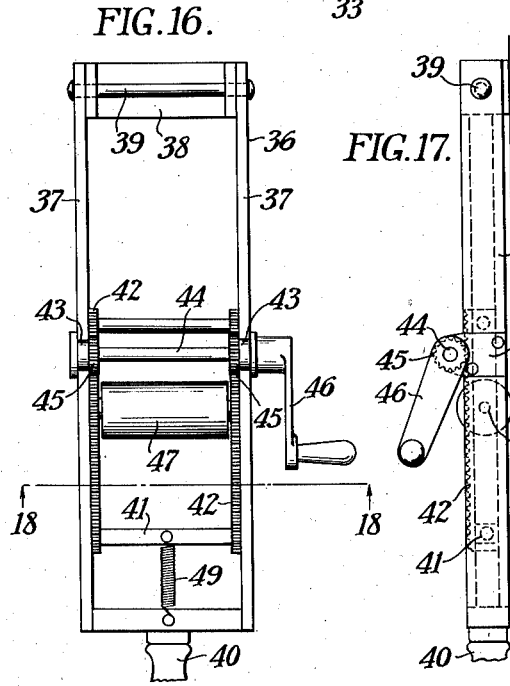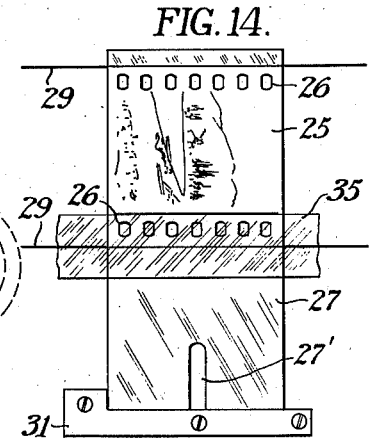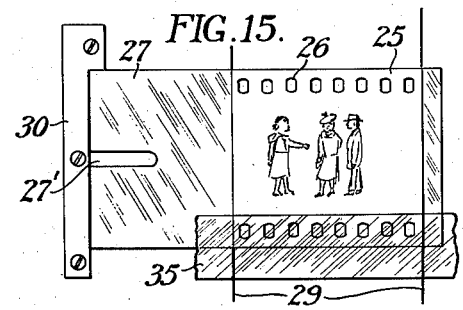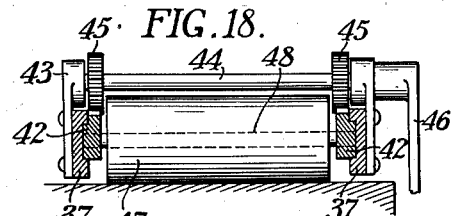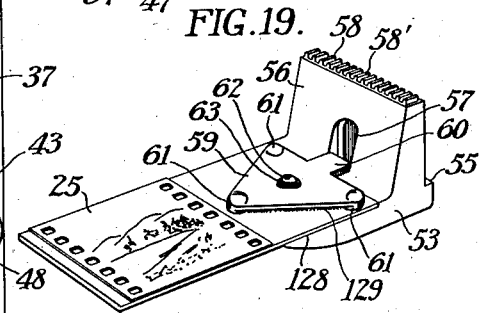

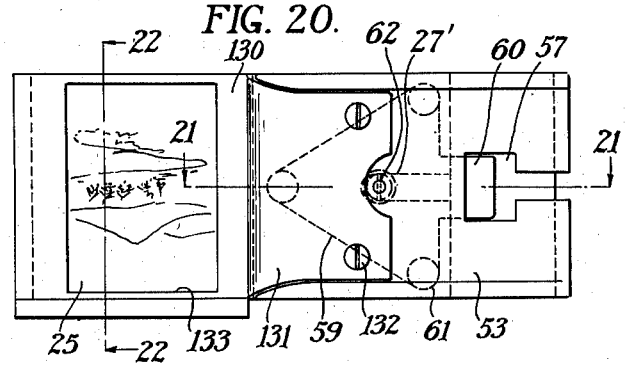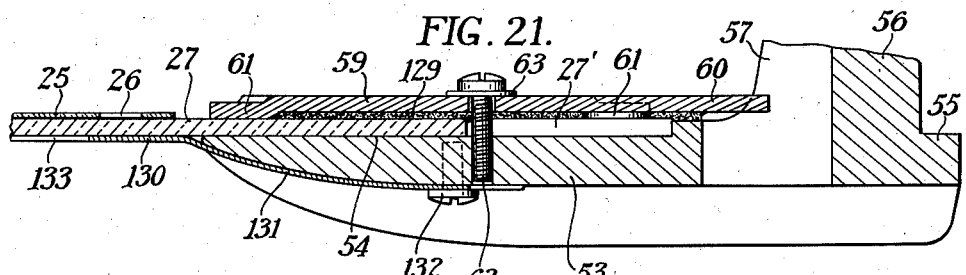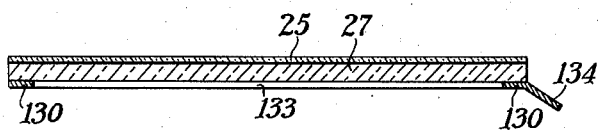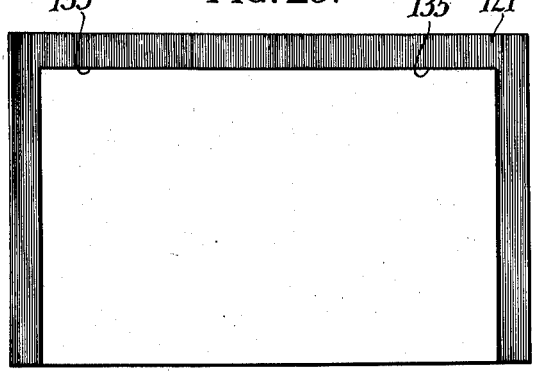
GEORGE J. KOCH
FORDYCE TUTTLE
INVENTORS Patented July 14, 1942

2,289,843

UNITED STATES PATENT OFFICE 2,289,843

TRANSPARENCY SLIDE-PROJECTOR HOLDER AND METHOD AND APPARATUS FOR ASSEMBLING THE SAME

George J. Koch, Long Island City, and Fordyce Tuttle, Rochester, N. Y., assignors to Eastman Kodak Company, Rochester, N. Y., a corporation of New Jersey Application August 2, 1940, Serial No. 349,584

30 Claims. (Cl. 88—26)

The present invention relates to a method and apparatus for assembling the elements of a transparency slide-projector holder, and more particularly to a transparency slide-projector holder which can be mounted in a high wattage projector.

Some of the problems to be overcome in mounting transparencies for use in a high wattage projector are, first, accurate location of the transparency with respect to a mechanical element or a toothed sector of a projector holder, second, the cementation of the photographic element or transparency onto a glass slide, and third, masking of the transparency.

The primary object of the present invention is the provision of a method and apparatus for optically indicating, with extreme accuracy, the precise position of a transparency slide with respect to a projector holder.

Another object of the invention is the provision of a method and apparatus for cementing a photographic image element onto a transparent or glass plate, so that the intense heat of the high wattage projection beam cannot curl the support of the photographic element or cause the same to be stripped from the transparent plate.

A further object of the invention is the provision of a method and apparatus for optically indicating to enlarged scale the relative position of the image element with respect to a projector holder, and also an arrangement for adjusting a transparency slide in its own plane until said slide is in a predetermined position with respect to the projector holder.

Still another object of the invention is a method of securing or cementing the transparency slide onto the projector holder in the accurately adjusted position of the transparency slide with respect to the holder.

A still further object of the invention is the provision of a method for adjusting a framing mask on the projector holder with respect to the photographic or transparent image element, so that all elements will be framed in precisely the same manner.

Other and further objects of the invention will be suggested or obvious to those skilled in the art.

The above mentioned and other objects of the invention are embodied in a method and apparatus for assembling a transparency slide and projector holder which comprises cementing the support of a cellulose derivative film element onto a transparent plate, supporting the transparency slide for movement relative to a projector holder fixed in a known position and having a mechanical element, projecting an image of at least a portion of the film element onto a screen bearing a facsimile of said projected portion of the film element, adjusting the transparency slide until the image projected from it corresponds or coincides with the facsimile on the screen, securing the transparency slide in its adjusted position to the projector holder, movably attaching a framing mask to the holder, projecting an image of at least one corner of said mask onto a screen bearing a facsimile of the corner, adjusting the mask to make the image of its corner coincide with the facsimile thereof on the screen, and securely fastening said framing mask to the projector holder.

Reference is hereby made to the accompanying drawings wherein similar reference characters designate similar elements and wherein:

Fig. 1 is a plan view of an optical jig for adjustably supporting a transparency slide and including a projector for projecting enlarged images of spaced portions of the image element.

Fig. 2 is a transverse cross-section of such an optical jig, taken on the line 2—2 of Fig. 1.

Fig. 3 is a longitudinal cross-section of the optical jig, taken on the line 3—3 of Fig. 1.

Fig. 4 is a side elevation of said optical jig showing the screen onto which images of portions of the film element are projected.

Fig. 5 is a rear elevation of the optical jig including a mirror and screen.

Fig. 6 is a fragmentary section of the projector housing and projection lenses, taken on the line 6—6 of Fig. 2.

Fig. 7 is a fragmentary section showing a guide for one of the adjustments as seen from the cutting plane 7—7 of Fig. 1.

Fig. 8 is a perspective view of a clamping plate for fastening the transparency slide to the holder according to the invention.

Fig. 9 is a plan detailed view of a transparency slide including a glass plate and photographic image element cemented thereto.

Fig. 10 is a plan view of the screen showing a pair of facsimiles thereon and indicating the projected images of the film perforations before adjustment of the transparency slide.

Fig. 11 is a similar view of the screen showing the images of the film perforations with respect to the facsimiles on the screen after the transparent slide has been properly adjusted with respect to the projector holder.

Fig. 12 is a plan view of the apparatus used for cementing of the photographic image element onto the transparent plate.

Fig. 13 is a fragmentary side elevation of such an apparatus showing the clamping members thereon.

Fig. 14 is a fragmentary plan view showing the transparent slide against a guide member with the photographic image element held in proper position on the slide by means of transparent adhesive tape.

Fig. 15 also shows the image element held in position on a transparent slide by adhesive tape, but in horizontal position instead of the vertical position shown in Fig. 14.

Fig. 16 is a plan view of the roller assembly for pressing the cemented film against the transparent plate.

Fig. 17 is a side elevation of such a roller assembly.

Fig. 18 is a transverse section of the roller assembly, taken on the line 18—18 of Fig. 16.

Fig. 19 is a perspective view of the assembled transparency slide and projector holder.

Fig. 20 is a rear view of the assembled transparency slide-projector holder, including a framing mask.

Fig. 21 is a fragmentary longitudinal section through the transparency slide-projector holder, taken on the line 21—21 of Fig. 20.

Fig. 22 is a transverse section of the transparent slide and framing mask, taken on the line 22—22 of Fig. 20.

Fig. 23 is a plan view of the screen member and facsimile thereon for indicating proper location of the framing mask on the projector holder.

While the present invention is disclosed with respect to the assembly of a transparency slide-projector holder for a high wattage projector, it is to be understood that various features of the invention may have other uses, and the scope of the invention is not to be limited in any way by the illustrated embodiment thereof.

The first step in the method of the invention constitutes cementation of a photographic image element onto a transparent plate and one type of apparatus for performing this step is illustrated in Figs. 12 to 18 inclusive.

The photographic transparency or image element 25 is of standard form, comprising a support of cellulose derivatives or cellulose esters, preferably cellulose acetate, and on one side carries a gelatino-silver-halide image layer. Said image element 25 is provided in the usual manner along its opposite margins with a plurality of perforations 26. The image element 25 is first mounted upon a transparent plate and, from the standpoint of rigidity and transparency, such plate is preferably in the form of a glass slide 27, which is provided in one end with a slot 27'.

Referring to Figs. 12 and 13, the apparatus for cementing the image element 25 onto the glass plate 27 comprises a base 28, provided with two pairs of parallel guide lines 29, the lines of each pair being perpendicular to each other. A guide member 30 is riveted to the base 28 and is recessed so as to locate a glass slide 27 with its outer portion over a pair of the guide lines 29. Another guide member 31 is riveted to base 28 and is also recessed so as to locate a glass slide 27 with its outer portion over the other pair of guide lines 29. A clamping assembly is associated with each of the guide members 30 and 31 and each comprises a clamp member 32 centrally and pivotally mounted upon the base 28 by means of a hinge 33 and normally pressed by a spring 34 to grip a slide lying on the base 28 and located by the respective guide member 30 or 31. Such clamping assemblies will hold a transparent slide 27 either in the position illustrated in Fig. 14, with the end of the slide against the guide member 31, or in the position illustrated in Fig. 15, with the end of the glass slide 27 against the guide member 30.

The image element 25 is placed over the glass slide 27 with its edges in alignment with two of the guide lines 29, and said image element 25 is temporarily held in this position by an adhesive tape placed over one of the perforated margins thereof. A strip of transparent adhesive tape 35 lies one-half over one perforated margin of the image element 25 and with its other half on the glass slide 27, see Fig. 14. For horizontal mounting of the image element 25 onto the glass slide, the transparent adhesive tape is also placed one-half over the image element, but with its other half on the surface of base 28.

The image element is now ready for cementing onto the glass slide and a suitable cement may be inserted between the image element 25 and the glass slide 27. Any cement that will hold the cellulose derivative or cellulose acetate film support onto a glass slide while subjected to the intense heat of a high wattage projector will be satisfactory. It has been found that a gelatin and nitro-cellulose sub has the necessary adhesion and heat-resisting characteristics. Specifically, one such gelatin nitro-cellulose sub which has been used with unusual success has the following formula, in which percentages are by weight:

| | Percent |
|---|---|
| Equal parts gelatin and alcohol-soluble cellulose nitrate | 8 |
| Acetone | 25 |
| Monomethyl ether of ethylene glycol | 17.4 |
| Methyl alcohol | 35.2 |
| Water | 8 |
| Acetic acid or its equivalent | 5.4 |
| Diethyl phthalate | 1 |

The cement or sub is spread over the uncoated side of the image element 25 in any suitable manner so as to get an even coating, and this can be conveniently done by merely swinging the image element upwardly around the adhesive tape 35 as a hinge. The image element is then pressed onto the glass slide 27 until the solvent of the sub evaporates or disperses into the support of the image element.

In order to secure the best adhesion and to prevent any excess cement or sub from getting onto the emulsion layer of the image element, a strip of paper is laid thereover and a roller passed from the taped side of the image element toward the other side. In this manner, the excess cement and any entrapped air bubbles are forced to the outer edges of the image element and up through the perforations 26 in the unfastened margin of the image element 25. The adhesive tape 35 prevents any excess sub from coming up through one row of perforations and being smeared onto the emulsion layer.

A convenient apparatus for rolling the image element onto the glass slide comprises a roller assembly including a frame 36 having side bars 37, pivotally connected at one end to the base 28 by a bracket 38 and hinge pin 39, and carrying at its other end a handle 40. A cradle 41 is slidably mounted within said frame 36 and includes side racks 42. Journals 43 are mounted on the side bars 37 and rotatably support a shaft 44 which carries pinions 45, meshing with said racks 42 and carrying a crank 46. A roller 47 of rubber or similar material is mounted on a shaft 48 having its ends supported in the side racks 42 of the cradle 41. A coiled spring 49 has one end attached to the frame 36 adjacent the handle 40 and has its other end connected to the end of cradle 41, so that the roller assembly is normally held near the outer end of the frame 36 or in the position shown in Figs. 16 and 17.

The rolling operation may now be readily performed by bringing the handle 40 and frame 36 forwardly and downwardly and pressing the roller 47 against the taped edge of the image element 25 or against a sheet of paper interposed therebetween. While holding the handle 40 to press the roller 47 against the image element, the crank 46 is rotated in turn to rotate pinions 45, slide the racks 42 and cradle 41 along the frame 36 and to move the roller 47 over the image element from the row of perforations 26 covered by the tape 35 toward the row of perforations in the opposite margin of the image element. When the crank 46 is released the coil spring 49 returns the roller assembly to its normal position for repetition of the operation.

An arm 50 is pivotally mounted upon a vertical shaft 51 extending from the base 28 and carries a magnifying glass 52 which may be swung over the image element 25 or glass slide 27 for close inspection of the image element or its relation to the glass slide 27 or to the guide lines 29.

Mounting the image element 25 on the glass slide 27 in the manner and with the apparatus just described produces a transparency slide which is ready to be mounted upon a projector holder. Such a projector holder is shown to best advantage in Figs. 19, 20 and 21. The projector holder comprises a body 53, having a plane portion 54, a projection 55, and a shoulder 56 provided with a slot 57 and carrying a plurality of mechanical elements or teeth 58. A clamp plate 59 is preferably triangular in shape, has a tongue 60 extending into the slot 57 and has a plurality of projections 61 which have their surfaces in a plane. A screw 62 extends through a lock washer 63, through clamp plate 59 and the slot 27' in glass slide 27 and is threaded into the body 53 of the projector holder.

In order that the images from the various slides will be in perfect registry, when the slide is mounted in a projector such as disclosed in the copending application of Tuttle and Fuller, Serial No. 350,004, filed August 2, 1940, for Photographic projector, the image elements 25 of all the transparency slide-projector holders must be in precisely the same position with respect to a mechanical element on the projector holder. In practice, the image elements 25 are accurately located with respect to the center tooth 58' of the teeth 58.

This extremely accurate adjustment of the transparency slide with respect to the projector holder will now be described and is best accomplished in an optical jig, which comprises a frame, a support for the projector holder, a transparency slide support, adjustable means for relatively moving the transparency slide with respect to the holder, a screen member bearing a facsimile of at least a portion of the transparency slide and a projector for projecting an image of that portion onto the screen.

The frame of such an apparatus comprises a hollow base 64, carrying a base plate 65, from which extends a support member 66. The support member 66 has a shoulder 67 similar to the support for the projector holder on the projector itself, and a clamping means, comprising a headed rod 68, an eccentric 69 and a handle 70, fasten the projector holder onto the shoulder 67, see Fig. 2.

A slide support means is adapted to hold the transparency slide adjacent the projector holder on the support member 66. Such a slide holder may comprise uprights 71, bolted to a slide 72, which is provided with a guideway 73. One clamp 74 is mounted on top of one upright 71, while the other upright 71 supports a block 75, in which an H-shaped clamp 76 is slidably mounted. A threaded sleeve 77 is attached to block 75 and a threaded stem 78 has a knurled disk 79 and extends into block 75 and through the central bar of clamp member 76 for swivel attachment thereto. Rotation of the disk 79 moves both legs of the clamp 76 toward or away from the opposite clamp 74 and a transparency slide including a glass slide 27 and an image element 25 thereon may be fastened between clamps 74 and 76 in the manner shown in Figs. 1, 2 and 3.

An adjustable means is placed between the clamping means just described and the base of the apparatus. One form of such adjustable means may comprise a guide block 80, having a trapezoidal projection 81 and supported from the base plate 65 by standards 82. A recess 83 is provided within guide block 80 and projection 81, and a threaded stem 84 extends into said recess 82, being journaled in the end of projection 81 and held against longitudinal movement by a pair of collars 85. A hand wheel 86 is mounted on the end of stem 84 for rotation thereof. A slide 87 has a guideway corresponding to projection 81 and carries a guide block 88, having a projection 89 corresponding to the guideway 73 in slide 72. A swivel post 90 is mounted in slide 87, has one end in threaded engagement with the threaded stem 84, and has its other end inserted into said guide block 88. A yoke 91 is fastened to guideway 88 and has a projection 92. A bracket 94 is mounted upon slide 87 and is threaded at one end to receive and support a threaded stem 93. A hand wheel 95 is mounted on the end of stem 93, which is intermediately guided and supported by a plate 96, mounted on support member 66 and provided with an elongated slot 97, through which the stem 93 extends. The other end of threaded stem 93 abuts against the projection 92 of yoke 91 and a coil spring 98 is connected at one end to said support member 66 and at the other end to the yoke 91 to hold said projection 92 against the end of stem 93. Finally, a hand wheel 99 is supported on the end of a stem 100 supported in guide block 88 in the same manner as stem 84 is supported in guide block 80 or projection 81. The projection 89 and guide block 88 are provided with a recess 101 into which a threaded portion of stem 100 extends. A post 102 is fastened to slide 72 and has a nut portion extending into recess 101 and into engagement with the threaded portion of stem 100. The details of construction of the guide blocks, as just explained, are very similar to those extensively used for supporting tool holders and the like on metal working machinery.

By reason of the adjustable means described, the clamps 74 and 76, the transparency slide therebetween and the uprights 71 may be moved in either of two directions or rotated so that the transparency slide is moved in its own plane. For instance, turning hand wheel 86 will move the transparency slide and associated clamping assembly to the right or left as viewed from Fig. 1; rotating the hand wheel 99 will move the transparency slide and associated clamps forward or back as viewed from Fig. 1; and rotating the hand wheel 95 will swing the slide and associated clamps about the swivel post 90.

A projector assembly comprises a light source, condenser and projection lenses for directing a beam through at least a portion of the transparency slide. The light source comprises an incandescent lamp 103, mounted in a socket 104 within the hollow base 64 and connected to a suitable source of electric energy. A blower 105 has a motor 106 and is connected to the hollow base 64 for directing a blast of air over the lamp 103 to cool the same. A condenser housing 107 is mounted on hollow base 64 and contains a condenser lens 108. The hollow base 64 is provided with an opening 109 through which the light from lamp 103 is directed to the condenser lens 108, and the condenser housing 107 is provided with a pair of slits 110 through which the light from condenser lens 108 is directed upwardly. A pair of columns 111 support each end of a cross plate 112. A pair of projection lenses 113 are mounted in lens barrels 114 and are supported upon the cross plate 112, preferably with their axes diverging upwardly. A pair of mounting plates 115 each have a lateral set screw 116 threaded into the mounting plate for engagement with the lens barrel 114. A screw 117 extends through each mounting plate 115 and each screw 117 carries a collar 118 to connect said screw to the mounting plate 115, so that it may rotate therein without any axial movement. The other end of the screw 117 is threaded into the cross plate 112. The mounting plates 115 are also provided with slots 119 which are diagonally opposite the screws 117 and through which extend screws 120 into the cross plate 112.

By means of the mounting arrangement just described or an equivalent structure, the projection lenses 113 may be adjusted to obtain proper divergence and focus thereof. Screws 120 may be loosened and the mounting plates 115 and lenses 113 moved around the centers of screws 117 for a proper lateral adjustment of the lenses to cover the area or areas of the transparency slide which is to be projected. The screws 117 may be adjusted to vary the angle of divergence between the axes of the projection lenses 113. Finally, the lateral set screws 116 may be loosened and the projection lenses moved axially with respect to the mounting plates 115, so that the focal plane of the objectives is at the surface of the image element 25 on the transparency slide which is held between the clamps 74 and 76.

A screen number 121, see Figs. 4 and 5, may be supported from the hollow base 64 by a pair of brackets 122. Inasmuch as the screen member must have a known position with respect to the support member 66 or projector holder thereon, it is preferable to mount said screen member 121 directly on said base 64 and to obtain a comparatively long projection throw by a reflector. For this purpose, a vertical column 123 is supported in a collar 124 on the base 64 and supports at its upper end an adjustable clamp bracket 125 carrying a mirror 126. Said mirror 126 is above the projection lenses 113 and is placed at an angle, so that the beams from the projection assembly are reflected onto the screen member 121.

One or more facsimiles of the projected portion of the transparency slide are provided on the surface of screen member 121. Such facsimiles may correspond to any part or all of the projected image, but preferably, and as illustrated, a pair of facsimiles 127 of the perforations 26 in the image element 25 is placed in spaced relation on the screen member 121. Referring to Figs. 1 and 2, it will be seen that the transparency slide is supported by the slide support means or clamps 74 and 76, so that the end perforations 26 of the image element 25 are in the beams from the lamp 103 passing through the slits 110, and the projection lenses 113 cover the extreme perforations 26 and project their images to the mirror 126, from which said images are reflected onto the screen 121. The order of magnification of such projection assembly may, of course, be selected according to the accuracy desired, and, in practice, a magnification of 100 diameters has been used. Such magnification of the perforation images would cause the images to overlap on the screen except for divergence of the axes of projection lenses 113. By reason of such divergence of the projection lenses, the perforation images on the screen 121 appear as represented by the perforation outlines 26', see Figs. 10 and 11.

The operation of the optical jig just described will now be explained in some detail. It is understood that the projector holder is located in a fixed and known position on the support member 66 by means of the headed rod 68 engaging the slot 57 in the projection holder and the eccentric 69 is operated by the handle 70 to draw the projection holder, and particularly the shoulder 56 and projection 55 thereof, against the shoulder 67 on support member 66. The glass slide 27 is supported between the clamps 74 and 76, see Figs. 1 and 3, so that the extreme perforations 26 of the image element 25 are in the projection beams from the slits 110 and are in the focal planes of the projection lenses 113. At the same time, one end of the glass slide 27 is between the plane portion 54 of the projector holder and the clamp plate 59 thereon, the screw 62 extending through the slot 27' in glass slide 27. The screw 62 is loose enough so that the glass slide 27 may be moved with respect to the plane portion 54 and clamp plate 59 on the projector holder.

Under these circumstances, the enlarged images of the perforations 26 may occur on the screen member 121, as illustrated in Fig. 10. The enlarged perforation images 26' may be angularly, transversely and longitudinally displaced with respect to the perforation facsimiles 127. As previously explained, rotation of the hand wheel 95 will cause rotation of the slide 72 and the clamps 74 and 76 supported therefrom, and said hand wheel 95 is operated until the perforation images 26' are parallel to the facsimiles 127 thereof. Operation of the hand wheel 86 moves the slide 87 to the left or right, as viewed from Figs. 1 and 3, and by means of this adjustment, the side edges of the perforation images 26' and of the facsimiles 127 are brought into coincidence. Finally, the hand wheel 99, which, as previously explained, moves the transparency slide forward or back, is operated to bring the ends of the perforation images 26' and facsimiles 127 into coinciding positions. After these adjustments have been made, the perforation images 26' will coincide with the perforation facsimiles 127, as illustrated in Fig. 11.

Since the projector holder and the mechanical elements thereon, particularly tooth 58', are in a fixed and predetermined position, and since the perforation facsimiles 127 are also in a predetermined position with respect to said projector holder on the support member 66 therefor, adjustment of the transparency slide in its plane until the enlarged images 26' of the spaced perforations of an image element 25 on the transparency slide coincide with the facsimile 127 insures that the transparency slide, and particularly the image element 25 thereon, will be located with extreme accuracy in a predetermined position with respect to the tooth 58' on the projector holder. It will be understood that the absolute location of the transparency slide with respect to the projector holder is of little importance and that the primary and outstanding function of the extremely accurate location of the transparency slide with respect to the projector holder is to locate each glass slide 27 and the image element 25 thereon in exactly the same relation to each projector holder and especially with respect to the tooth 58' thereon. The uniformity of relative positioning between the image element 25 and tooth 58' of the projector holder determines the registry of the successive images in the high wattage projector disclosed in the aforementioned application of Tuttle and Fuller.

After the glass slide 27 and image element 25 have been accurately and relatively located with respect to the projector holder, the screw 62 is tightened firmly to hold the glass slide 27 in this adjusted position on the plane portion 54 of the projector holder. Such tightening of the screw 62, see Fig. 21, presses the surfaces of projections 21 against the surface of glass slide 27. Since the surfaces of projection 61 are in the same plane and press the glass slide 27 against the plane portion 54 of the projector holder, there is little, if any, likelihood that the glass slide 27 will be strained or cracked by this tightening of the screw 62. However, the screw 62 is not tightened as much as possible at this time.

Maintenance of this accurate positioning of the slide and projector holder is insured by the provision of several cemented bonds between the glass slide 27, the projector holder and the clamp plate 59. To this end, a glass-to-metal cement is placed on the glass slide 27 around the edges of clamp plate 59 and also along the side edges of the slide 27 and adjacent area of the projector holder, indicated as 128 in Fig. 19. The projections 61 of the clamp plate 59 provide a space for the reception of such cement and within which a cemented bond 129 is formed, see Fig. 21. After the cemented bond 129 has been formed, the screw 62 is further tightened to compress the cemented bond 129 and to maintain the adjusted relationship between the transparency slide and projector holder with great accuracy and permanence.

As previously suggested, the cemented bonds 128 and 129 may be formed of any good glass-to-metal cement, and particularly alkyd resin cements. However, by actual experience, it has been found that glyptal resin cements are unusually suited to this purpose. As is known, glyptal resins are reaction or condensation products of polyhydric alcohols and polybasic acids, the preparation of which is described on page 293 of the book by Carlton Ellis, entitled "Synthetic Resins and Their Plastics," published in 1923 by the Chemical Catalog Company. Such glyptal resins may be dissolved in a solvent including one or more of the following solvents: toluol, xylol, coal tar solvent naphtha or petroleum solvent naphtha. The variety and proportions of the solvents used depend on the drying properties required and more specifically Glyptol cement No. 1276, made by the General Electric Company of Schenectady, New York, has been extensively used to form cemented bonds which have been extremely satisfactory in actual practice.

For the purpose of framing the image element and for protecting the unused portions of the transparency slide from the high wattage projection beam, a framing mask 130 is mounted upon the projector holder and is arranged to cover that side of the transparency slide which does not carry the image element 25. The framing mask 130 has a curved portion 131 which is fastened to the body 53 of the projector holder by a pair of screws 132. The main body of the framing mask 130 lies adjacent the bare side of glass slide 27, see Figs. 20 and 21, and is provided with an opening 133 which determines the area of the image element 25 to be projected. The framing mask 130 also has an angular flange 134 inclined away from the slide 27. The outer surface of the framing mask 130 or the surface facing the light source in the projector is bright or polished, whereas the other surface of mask 130 which is adjacent the slide 27 or which faces the front of the projector is blackened to prevent reflection of any extraneous light onto the screen. The angular flange 134 overlaps the adjacent transparency slide-projector holder on the projector also to prevent extraneous light from passing between a series of the transparency slide-projector holders.

Although it is possible, by mechanical means, to locate the framing mask 130 on the projector holder with sufficient accuracy for ordinary projection purposes, it is also possible to use the method and apparatus of the present invention accurately to position the framing mask on the projector holder. It is merely necessary to provide another apparatus with projection lenses for covering the corners of the opening 133 in the framing mask 130 and to provide a rectangular facsimile 135 upon the screen member 121 of such an apparatus. Then, the framing mask 130 may be moved until the image or images of the corners of the opening 133 coincide with the corners of the facsimile 135, whereupon the screws 132 may be tightened down to hold the framing mask 130 in such adjusted position.

Since the transparency slide-projector holder and method and apparatus for assembling the same may be varied considerably from the specific form disclosed herein, the present drawings and description are to be construed in an illustrative sense and the scope of the invention is defined in the claims which follow.

Having now particularly described our invention what we desire to secure by Letters Patent of the United States and what we claim is:

1. A method of making a transparency slide-projector holder assembly, which comprises placing a layer of liquid cement on one side of a cellulose derivative film element having on its other side an image layer, pressing the cement covered side of said film element against a transparent plate until the cement is set and to form a transparency slide, supporting said transparency slide for movement relative to a projector holder fixed in a known position and having a mechanical element, projecting an image of at least a portion of said film element onto a screen bearing a facsimile of said portion in a predetermined position with respect to the mechanical element of said holder, adjusting said transparency slide to make the image projected from it correspond to said facsimile on the screen, and fixing said transparency slide in its adjusted position to said projector holder, movably attaching a framing mask to said holder, projecting an image of at least one corner of said mask onto a screen bearing a facsimile of such corner in a predetermined position with respect to said holder, adjusting said mask to make the image of its corner coincide with the facsimile thereof, and securely fastening said framing mask to said holder.

2. A method of making a transparency slide-projector holder assembly, which comprises placing a layer of liquid cement on one side of a cellulose derivative film element having on its other side an image layer, pressing the cement covered side of said film element against a transparent plate until the cement is set and to form a transparency slide, supporting said transparency slide for movement relative to a projector holder fixed in a known position and having a mechanical element, projecting an image of at least a portion of said film element onto a screen bearing a facsimile of said portion in a predetermined position with respect to the mechanical element of said holder, adjusting said transparency slide to make the image projected from it correspond to said facsimile on the screen, clamping said transparency slide to said projector holder, and forming a cement bond between said slide and said holder.

3. A method of making a transparency slide-projector holder assembly, which comprises placing a layer of liquid cement on one side of a cellulose derivative film element having on its other side an image layer, pressing the cement covered side of said film element against a transparent plate until the cement is set and to form a transparency slide, supporting said transparency slide for movement relative to a projector holder fixed in a known position and having a mechanical element, projecting enlarged images of spaced portions of said film element onto a screen bearing a pair of facsimiles of said portions, which facsimiles are in a predetermined position with respect to the mechanical element of said holder, adjusting said transparency slide to make the images of its portions coincide with respective facsimiles, clamping said transparency slide to said projector holder, and forming a plurality of cement bonds between said slide and said holder.

4. A method of making a transparency slide-projector holder assembly, which comprises placing a layer of a gelatin-cellulose nitrate sub on one side of a cellulose derivative film element having on its other side a gelatino-silver halide image layer, pressing the sub covered side of said film element against a glass plate to form a transparency slide, supporting said transparency slide for movement relative to a fixed projector holder having a mechanical element in a known position, projecting an enlarged image of at least a portion of the image of said transparency slide onto a screen bearing a facsimile of said image portion, said facsimile being in a predetermined position with respect to the mechanical element of said holder, adjusting said transparency slide to make the image of its portion coincide with said facsimile, clamping said transparency slide to said projector holder in the adjusted position of said slide, and forming a cemented bond of a glyptal resin between said slide and said holder.

5. A method of making a transparency slide-projector holder assembly, which comprises locating a film element with two opposite perforated margins on a glass slide by a strip of adhesive tape placed to cover one of said perforated margins, placing a gelatin-cellulose nitrate sub on one side of the cellulose ester base of said film element which has a gelatino-silver halide image layer on its other side, pressing the sub covered side of said film element against the glass slide by a roller moved across the film element from the strip of tape to the other perforated margin to form a transparency slide, supporting said transparency slide for movement relative to a fixed projector holder having a mechanical element in a known position, projecting enlarged images of spaced perforations of said film element onto a screen bearing a pair of correspondingly enlarged facsimiles of said perforations located in predetermined positions with respect to the mechanical element of said holder, adjusting said transparency slide to make the images of the perforations coincide with the facsimiles thereof, clamping said transparency slide to said projector holder in the adjusted position, and forming a plurality of cement bonds between said slide and said holder.

6. A method of mounting onto a transparent slide a photographic transparency including a film base of a cellulose derivative having on one side a gelatino-silver halide image layer, which comprises placing a layer of gelatin and nitro-cellulose sub between the uncoated side of said transparency and said transparent slide, and pressing said transparency toward said slide to remove the air bubbles and any excess cement therebetween.

7. A method of mounting onto a glass slide a photographic transparency including a film base of cellulose ester having on one side a gelatino-silver halide image layer, which comprises inserting a layer of gelatin and nitro-cellulose sub between the uncoated side of said cellulose ester film base and said glass slide, and pressing said transparency and slide toward each other to remove any excess sub or air bubbles therebetween.

8. A method of mounting onto a glass slide a photographic element provided with two perforated margins and including a film base of a cellulose derivative having on one side a gelatino-silver halide image layer, which comprises placing an adhesive tape over one perforated margin of the photographic element and part of the glass slide, placing a layer of gelatin and nitro-cellulose sub between the uncoated side of said photographic element and said transparent slide, and pressing said photographic element onto said slide by exerting pressure upon the transparency progressively from said taped margin to the other to squeeze out any air bubbles or excess sub between said transparency and said slide.

9. A method of mounting a transparency slide onto a projector holder having a mechanical element and a clamping plate, which comprises adjusting the transparency slide with respect to the mechanical element of said holder, tightening the clamping plate onto said holder to maintain said transparency slide in its adjusted position, and cementing said transparency slide to said holder and to said clamping plate.

10. In an apparatus for precisely locating a projection slide with respect to a projector slide holder, the combination with a frame, a support member thereon similar to the support for a projector slide holder on the projector and for supporting a projector slide holder, a slide support means adapted to hold a projection slide adjacent a projector slide holder on said support member, and an adjustable means between said slide support means and said frame and for relatively moving a projection slide with respect to a projector slide holder, of a screen member on said frame and bearing a facsimile of at least a portion of the projection slide, and a projector assembly for projecting onto said screen member an image from the projection slide corresponding to said facsimile.

11. In an apparatus for precisely locating a projection slide including a perforated element with respect to a projector slide holder, the combination with a frame, a support member thereon, similar to the support for a projector slide holder of the projector, and for supporting a projector slide holder, a slide support means adapted to hold a projection slide adjacent a projector holder on said support member, and an adjustable means between said slide support means and said frame and for relatively moving a projection slide with respect to a projector slide holder, of a screen member on said frame and bearing an enlarged facsimile of a perforation in the element of said projection slide, and a projector assembly including a light source and a projection lens on opposite sides of the projection slide and for projecting onto said screen an image of a perforation of said element enlarged to correspond to said facsimile.

12. In an apparatus for precisely locating a transparency slide including an image element provided with a plurality of perforations with respect to a projector holder, the combination with a frame, a support member thereon, similar to the support for a projector holder of the projector, and for supporting a projector holder, a transparency slide support means adapted to hold a transparency slide adjacent a projector holder on said support member, and an adjustable means between said slide support means and said frame, and for relatively moving a transparency slide with respect to a projector holder, of a screen member on said frame and bearing a pair of enlarged facsimiles of perforations in the image element of said transparency slide, and a projector assembly including a pair of projection lenses for projecting onto said screen images of two perforations of said element enlarged to correspond to said facsimile.

13. In an apparatus for precisely locating a transparency slide including an element provided with a plurality of perforations and with respect to a projector slide holder, the combination with a frame, a support member thereon similar to the support for a projector holder of the projector, a slide support means adapted to hold a transparency slide adjacent a projector holder on said support member, and an adjustable means between said slide support means and said frame and for relatively moving a transparency slide with respect to a projector holder, of a screen member on said frame and bearing a pair of enlarged and spaced facsimiles of perforations in the element of said transparency slide, and a projector assembly including a pair of projection lenses having their axes inclined to project onto said screen a pair of images of displaced perforations of said element enlarged and spaced to correspond to said facsimiles on the screen member.

14. In an apparatus for precisely locating a transparency slide with respect to a projector holder, the combination with a frame, a support member thereon similar to the support for a projector holder of the projector, a slide support means adapted to hold a transparency slide adjacent a projector holder on said support member, and an adjustable means between said slide support means and said frame and for relatively moving a transparency slide with respect to a projector holder, of a screen member on said frame and bearing an enlarged facsimile of at least a portion of the transparency slide, and a projector assembly for projecting onto said screen member an image from the transparency slide enlarged to correspond to said facsimile.

15. In an apparatus for precisely locating a transparency slide with respect to a projector holder, the combination with a frame, a support member thereon similar to the support for a projector holder of the projector, a slide support means adapted to hold a transparency slide adjacent a projector holder on said support member, and an adjustable means between said slide support means and said frame and having a plurality of movements to move a transparency slide in its frame with respect to a projector holder, of a screen member on said frame and bearing a facsimile of at least a portion of the transparency slide, and a projector assembly for projecting onto said screen member an image from the transparency slide corresponding to said facsimile.

16. In an apparatus for precisely locating a projection slide with respect to a projector holder, the combination with a frame, a support member thereon similar to the support for a projector slide holder of the projector and for supporting a projector slide holder, a slide support means adapted to hold a projection slide adjacent a projector slide holder on said support member, and a plurality of threaded means between said slide support means and said frame and for moving a projection slide in its plane with respect to a projector slide holder, of a screen member on said frame and bearing a facsimile of at least a portion of the projection slide, and a projector assembly for projecting onto said screen member an image from the projection slide corresponding to said facsimile.

17. In an apparatus for precisely locating a transparency slide with respect to a projector holder, the combination with a frame, a support member thereon similar to the support for a projector holder of the projector, a slide support means adapted to hold a transparency slide adjacent a projector holder on said support member, and an adjustable means between said slide support means and said frame and for rotating a transparency slide in its plane with respect to a projector holder, of a screen member on said frame and bearing a facsimile of at least a portion of the transparency slide, and a projector assembly for projecting onto said screen member an image from the transparency slide corresponding to said facsimile.

18. In an apparatus for precisely locating a transparency slide with respect to a projector holder, the combination with a frame, a support member thereon similar to the support for a projector holder of the projector, a slide support means adapted to hold a transparency slide adjacent a projector holder on said support member, and an adjustable means between said slide support means and said frame and for moving a projection slide in its plane transversely of a projector holder, of a screen member on said frame and bearing a facsimile of at least a portion of the transparency slide, and a projector assembly for projecting onto said screen member an image from the transparency slide corresponding to said facsimile.

19. In an apparatus for precisely locating a transparency slide with respect to a projector holder, the combination with a frame, a support member thereon similar to the support for a projector holder of the projector, a slide support means adapted to hold a transparency slide adjacent a projector holder on said support member, and an adjustable means between said slide support means and said frame and for moving a transparency slide in its plane longitudinally of a projector holder, of a screen member on said frame and bearing a facsimile of at least a portion of the transparency slide, and a projector assembly for projecting onto said screen member an image from the transparency slide corresponding to said facsimile.

20. As an article of manufacture, a transparency slide-projector holder assembly comprising a transparent plate, a photographic element including a cellulose derivative support having an image layer on one side thereof, a tenacious and heat resisting sub between said transparent plate and the other side of said cellulose derivative support, a projector holder having a mechanical element, a clamping means attached to said holder and for holding said transparent slide in a precise predetermined position thereon and with respect to said mechanical element, and cemented bond between said transparent plate and said clamping means and projector holder for maintaining the precise relationship between said plate and said mechanical element.

21. As an article of manufacture, a transparency slide-projector holder assembly comprising a glass plate, a photographic element including a support of cellulose ester having on one side a gelatino-silver halide image layer, a gelatin and nitro-cellulose sub between said glass plate and the other side of said cellulose ester support, a projector holder having a toothed portion and a plane portion, a clamping plate having three spaced protuberances with their surfaces in a plane, a fastening means connected to said holder and for pressing said protuberances of said clamping plate against said glass plate to hold the same against the plane portion of said holder with the image of said photographic element in precise relative position with respect to one of the teeth in said toothed portion, and bond of glyptal resin between said clamping plate and said glass plate and between said projector holder and said glass plate.

22. As an article of manufacture, a projector slide assembly comprising a projector holder having a mechanical element and a plane portion, a plate having three spaced protuberances with their surfaces in a plane, a transparent slide carrying a photographic element and adapted to be inserted between the plane portion of said holder and the plane surfaces of the protuberances on said plate, and a fastening means between said plate and said holder and for holding said slide and the photographic element thereon in a predetermined position with respect to said mechanical element.

23. As an article of manufacture, a projector slide assembly comprising a projector holder having a plane portion, a clamping plate attached to said holder opposite said plane portion thereof and having a plurality of spaced protuberances, a transparent slide between said clamping plate and holder, and a bond of cement between said plate and said slide.

24. As an article of manufacture a projector slide assembly comprising a projector holder having a plane portion, a clamping plate attached to said holder opposite said plane portion thereof and having a plurality of spaced protuberances, a transparent slide between said clamping plate and holder, and a bond of glyptal resin between said plate and said slide.

25. As an article of manufacture, a projector slide assembly comprising a projector holder having a plane portion, a clamping plate attached to said holder opposite said plane portion thereof, a glass slide between said clamping plate and holder, and a bond of glyptal resin between the edges of said glass slide and said holder.

26. As an article of manufacture, a transparency slide unaffected by high wattage illumination comprising a glass plate, a photographic transparency including a support of cellulose ester having on one side a gelatino-silver halide image layer, and a bond of heat resisting cement between said glass plate and the uncoated side of said cellulose ester support.

27. As an article of manufacture, a transparency slide unaffected by high wattage illumination comprising a glass plate, a photographic transparency including a support of cellulose ester having on one side a gelatino-silver halide image layer, and a bond of gelatin and nitrocellulose sub between said glass plate and the uncoated side of said cellulose ester support.

28. As an article of manufacture, a transparency slide-projector holder comprising a projector holder having a plane portion, a clamping plate attached to said holder opposite said plane portion thereof, a transparency slide having an image element on one surface thereof and having one end fastened between said clamping plate and the plane portion of said holder, and a framing mask attached to said holder, arranged to cover the other side of said transparent slide and provided with an opening for framing the image element on the opposite side of said transparency slide.

29. As an article of manufacture, a transparency slide-projector holder comprising a projector holder having a plane portion, a clamping plate attached to said holder opposite said plane portion thereof, a transparency slide having an image element on one surface thereof and having one end fastened between said clamping plate and the plane portion of said holder, and a framing mask attached to said holder, having on one side a blackened surface adjacent the other side of said transparent slide and having a bright surface on its opposite side, and provided with a framing opening for the image element.

30. As an article of manufacture, a transparency slide-projector holder comprising a projector holder having a plane portion, a clamping plate attached to said holder opposite said plane portion thereof, a transparency slide having an image element on one surface thereof and having one end fastened between said clamping plate and the plane portion of said holder, and a framing mask attached to said holder, arranged to cover the other side of said transparent slide, and having an angular flange along one edge of said transparency slide and inclined away therefrom.

GEORGE J. KOCH.
FORDYCE TUTTLE.